Figure 4:
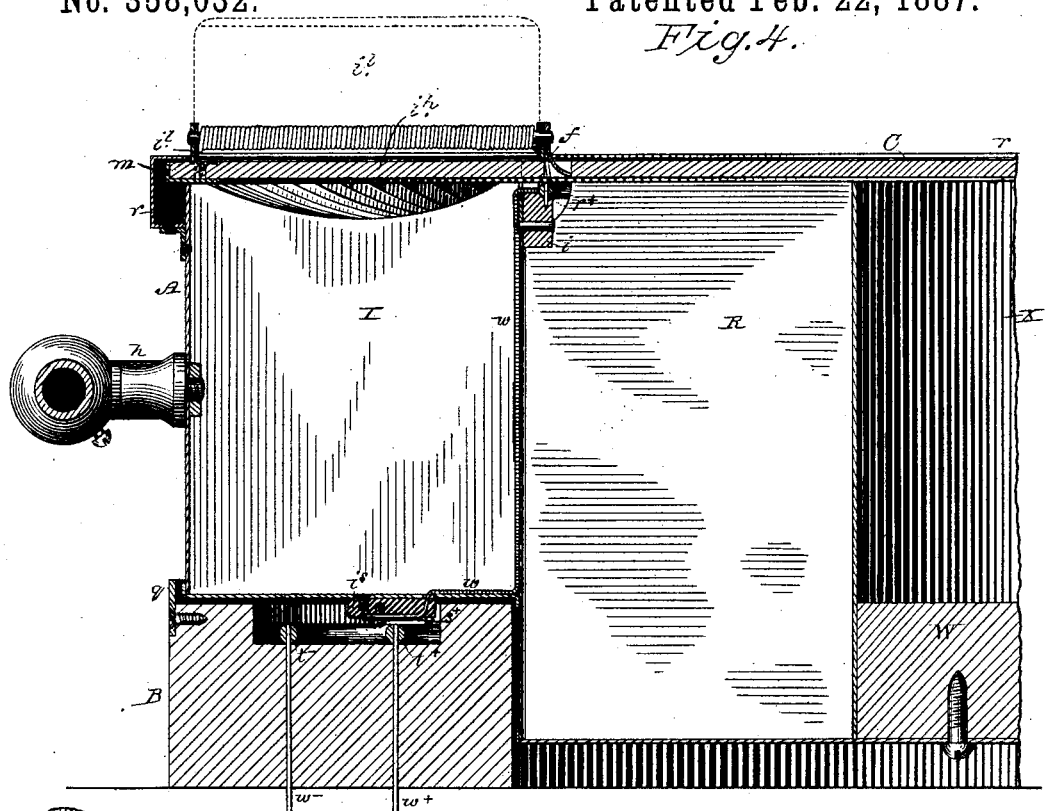

(No Model.) 6 Sheets—Sheet 1.
J. S. GOLDSMITH.
TIME CHECK APPARATUS.
No. 358,032. Patented Feb. 22, 1887.
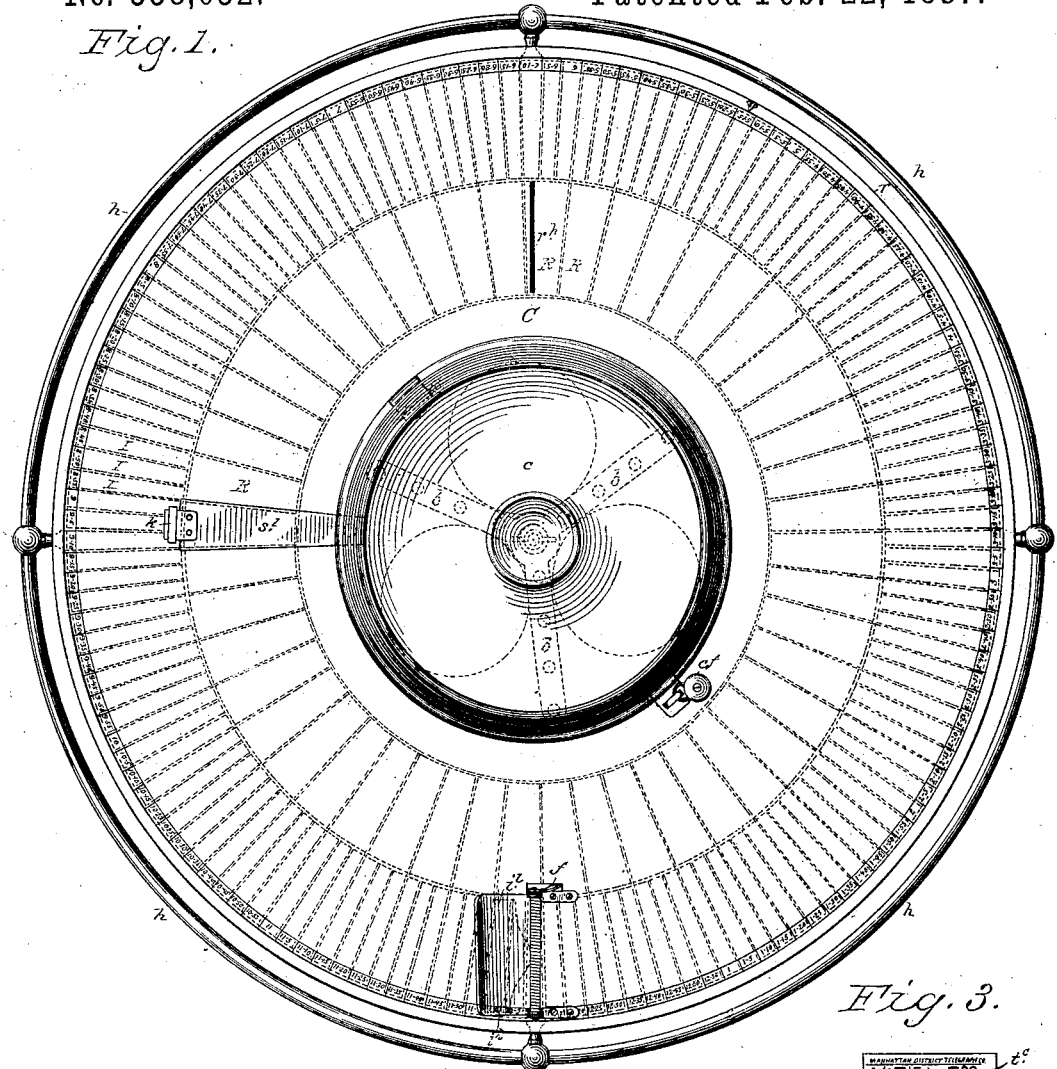
Fig. 1.
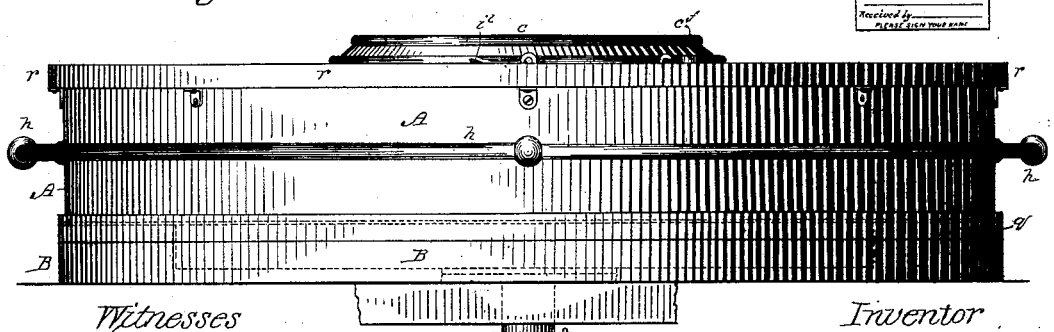
Fig. 2.
Fig. 3.
Witnesses
Ed. A. Newman,
Al. C. Newman.
Inventor
JOHN S. GOLDSMITH,
By his Attorney (No Model.) 6 Sheets—Sheet 2.

J. S. GOLDSMITH.
TIME CHECK APPARATUS.

No. 358,032. Patented Feb. 22, 1887.

Witnesses
Ed. A. Newman
Al. C. Newman

Inventor,
JOHN S. GOLDSMITH,
By his Attorney (No Model.) 6 Sheets—Sheet 3.
J. S. GOLDSMITH.
TIME CHECK APPARATUS.
No. 358,032. Patented Feb. 22, 1887.
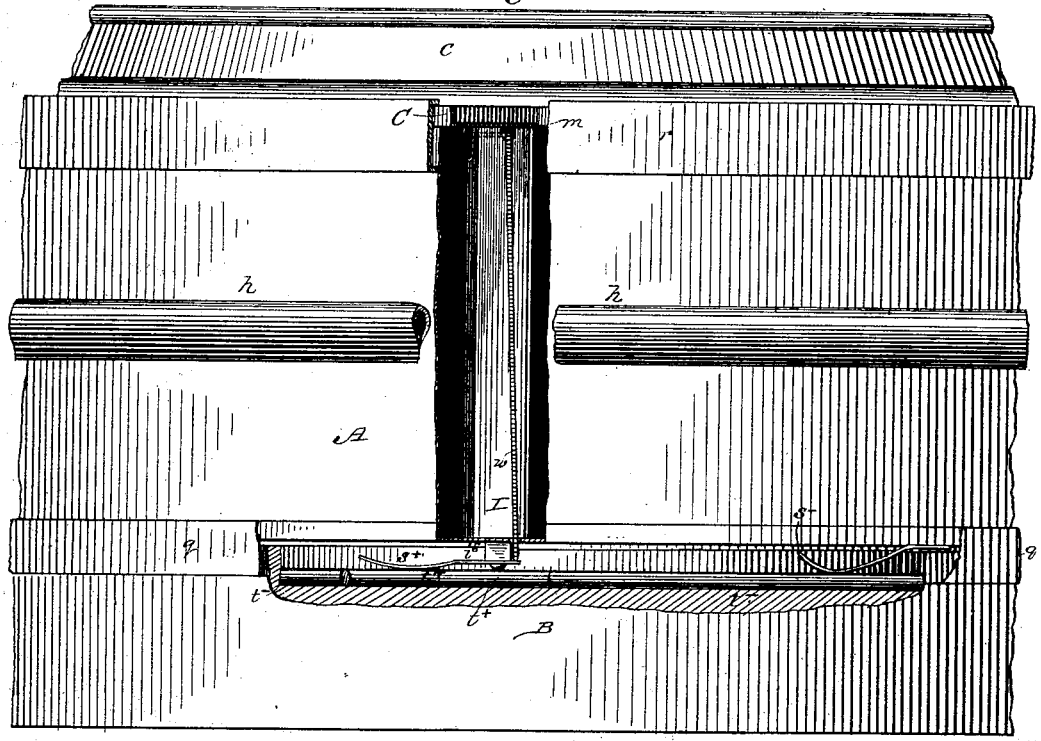
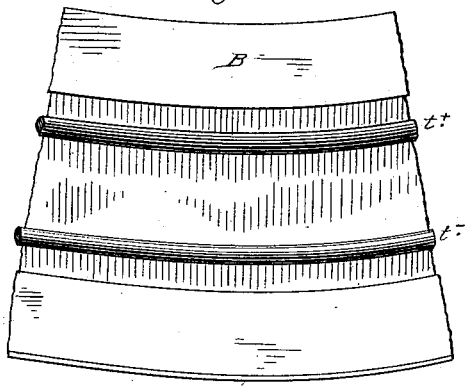
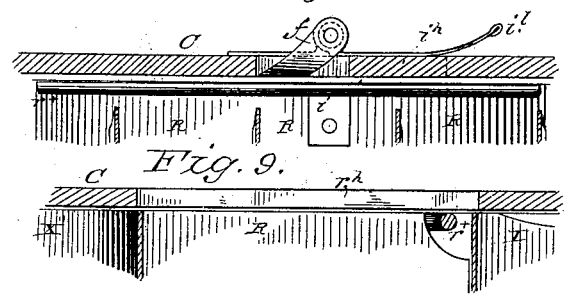
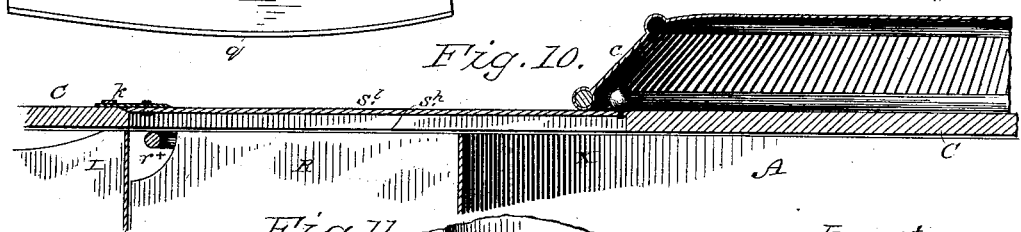
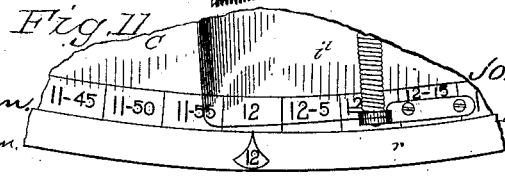
Witnesses
Ed. A. Newman
Al. C. Newman
Inventor
JOHN S. GOLDSMITH,
By his Attorney (No Model.) 6 Sheets—Sheet 4.

J. S. GOLDSMITH.
TIME CHECK APPARATUS.

No. 358,032. Patented Feb. 22, 1887.

Witnesses
Ed. A. Newman,
Al. C. Newman.

Inventor
JOHN S. GOLDSMITH,
By his Attorney (No Model.) 6 Sheets—Sheet 5.
J. S. GOLDSMITH.
TIME CHECK APPARATUS.
No. 358,032. Patented Feb. 22, 1887.
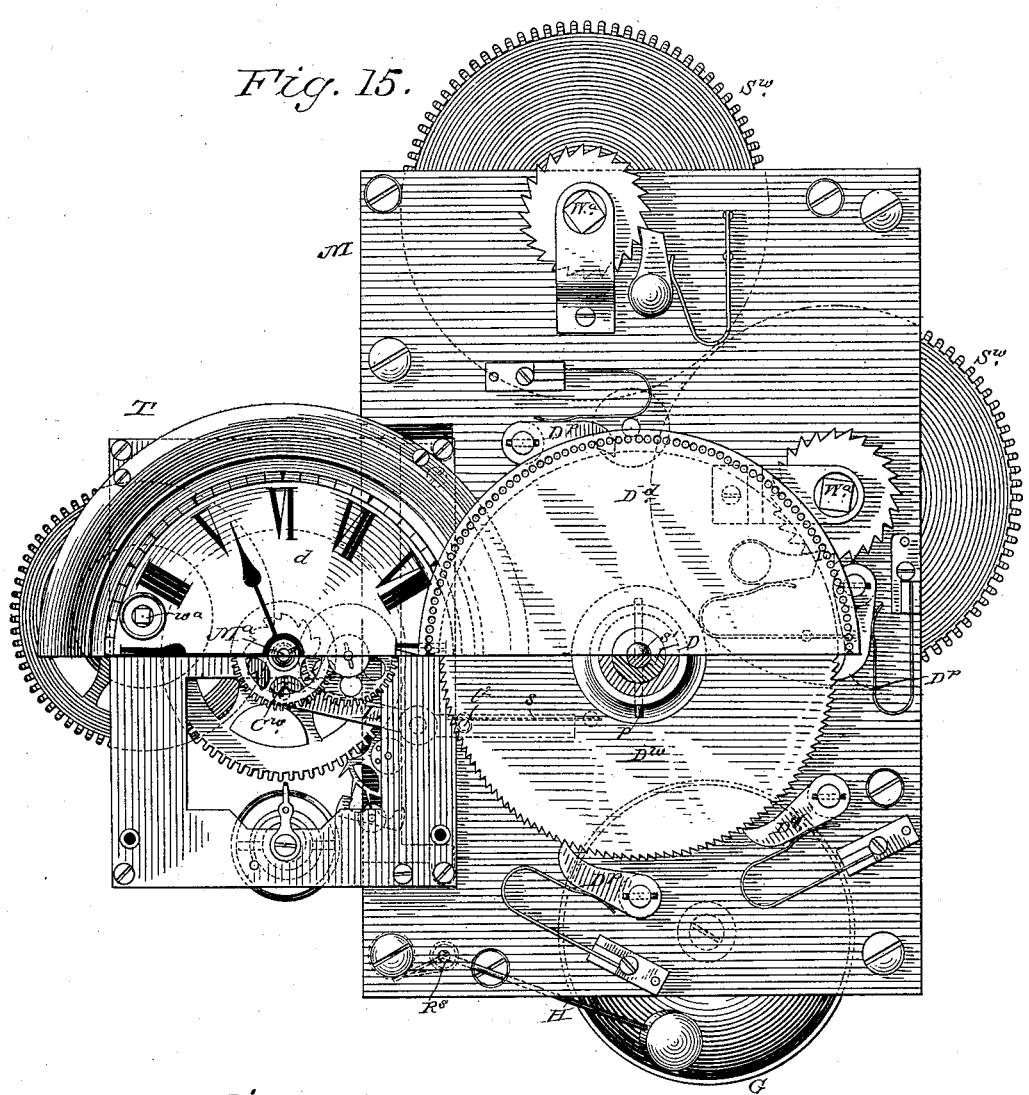
Fig. 15.
Fig. 16.
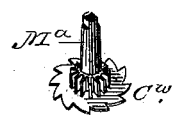
Fig. 17.
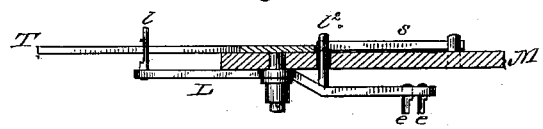
Witnesses
Ed. A. Newman
Al. C. Newman
Inventor
JOHN S. GOLDSMITH,
By his Attorney (No Model.) 6 Sheets—Sheet 6.
J. S. GOLDSMITH.
TIME CHECK APPARATUS.
No. 358,032. Patented Feb. 22, 1887.
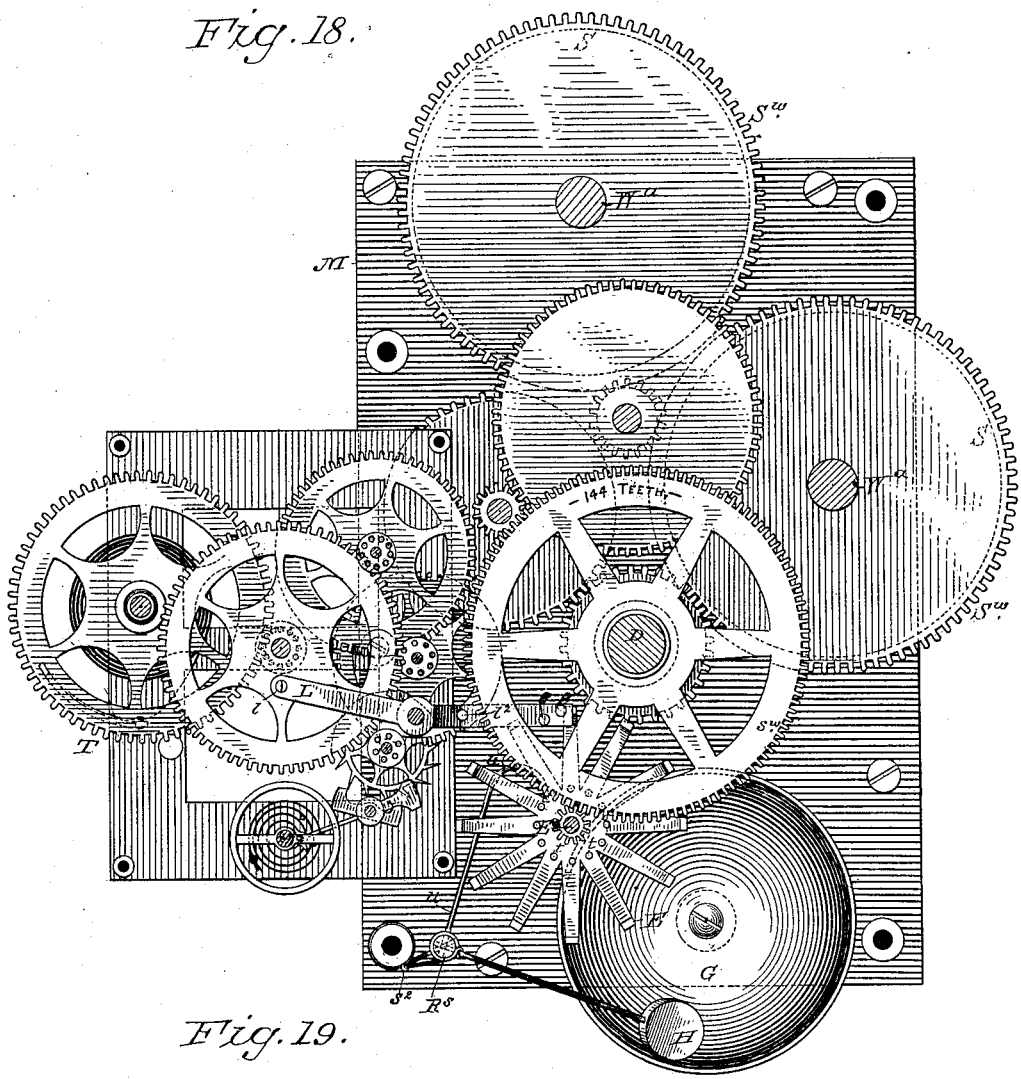
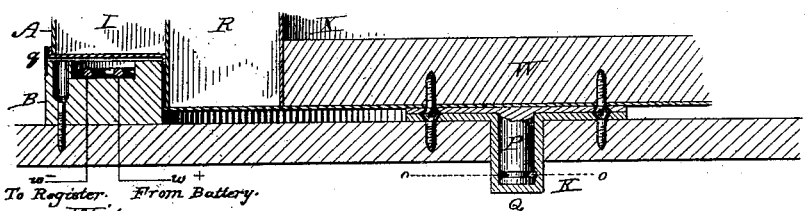
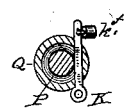
Witnesses
Ed. A. Newman.
Al. C. Newman.
Inventor
JOHN S. GOLDSMITH,
By his Attorney

UNITED STATES PATENT OFFICE.

JOHN S. GOLDSMITH, OF NEW YORK, N. Y.

TIME-CHECK APPARATUS.

SPECIFICATION forming part of Letters Patent No. 358,032, dated February 22, 1887.

Application filed September 21, 1885. Serial No. 177,750. (No model.)

*To all whom it may concern:*

Be it known that I, JOHN S. GOLDSMITH, a citizen of the United States, residing at New York, in the State of New York, have invented a new and useful Improvement in Time-Check Apparatus, of which the following is a specification.

In certain previous specifications I have set forth improvements in "apparatus for controlling the issue of time-checks," "apparatus for receiving time-checks," "time-check systems," and "check-tickets for messenger service." (See Letters Patent Nos. 326,493, 326,494, and 326,495, dated September 15, 1885, and application No. 168,169, filed June 9, 1885.

The present invention, in common with my said previous inventions, relates, primarily, to means for preventing or repressing certain dishonest practices on the part of clerks and messengers of district-telegraph companies and other messenger agencies, and, generally, to means for insuring correct entries, charges, and returns where length of time is an element in the computation, and for detecting tardiness or unauthorized absences or delays, either or both.

This invention consists in a combined issue-controlling and receiving apparatus for use in connection with messenger-tickets or other time-checks or the like, and in certain novel combinations of parts therein, some of which may be embodied either in issue-controlling or in receiving apparatus, as hereinafter set forth and claimed.

The special objects of this invention, apart from economizing space and facilitating oversight, are to provide for reducing the time-control period to five minutes or less without unduly reducing the width of radial issue-compartments or the capacity of the receiving-compartments; to facilitate and expedite the work of inspecting the apparatus by "stripping" one or more selected receiving-compartments and examining their contents, and that of replenishing the issue-compartments and emptying the receiving-compartments at the beginning or end of each day, and to insure correctly readjusting the mask after such operations; to provide for the employment of "motor" clock-work of ample power for intermittently driving the rotary mask, and to prevent "backlash" and injurious strains therein; to register or record each opening of the issue-compartments for the withdrawal of tickets or checks; to provide for readily turning the check-case so as to keep the issue and receiving holes in convenient positions, and to preserve at the same time an unbroken electrical connection with the register or recorder and the battery, or with a battery or dynamo as means for driving or controlling the movements of the motor and time mechanisms, or either of them; and, finally, to facilitate so turning the check-case, and at the same time to effectively resist lifting it, which would break said electrical connection.

Six sheets of drawings accompany this specification as part thereof.

Figure 5:
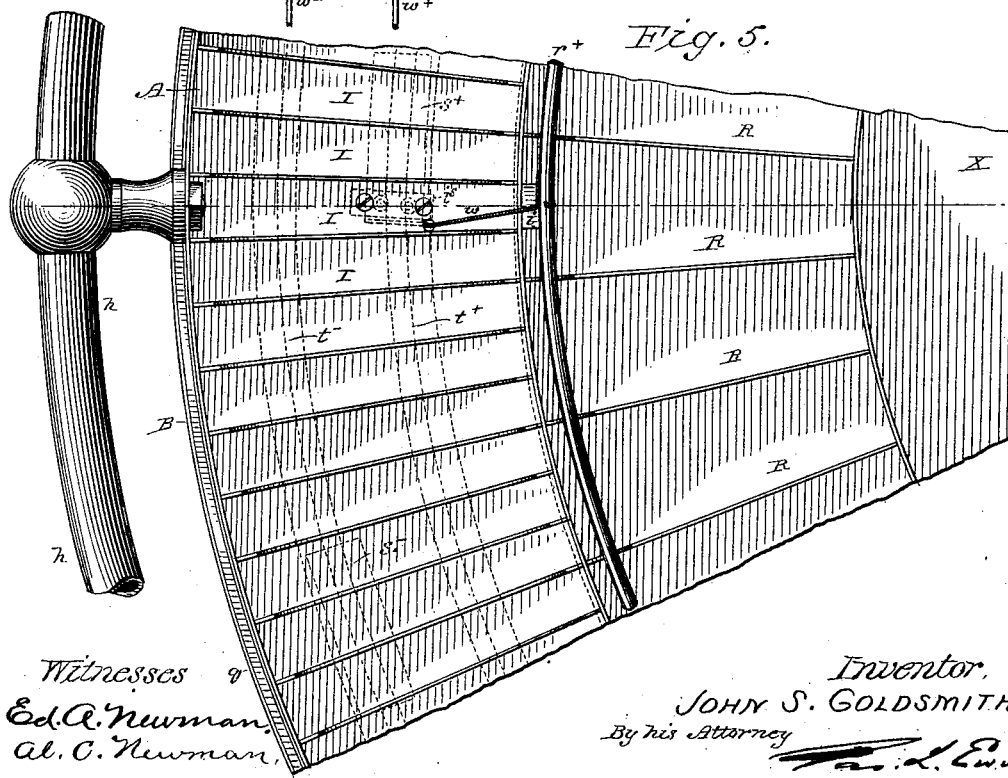
Figure 12:
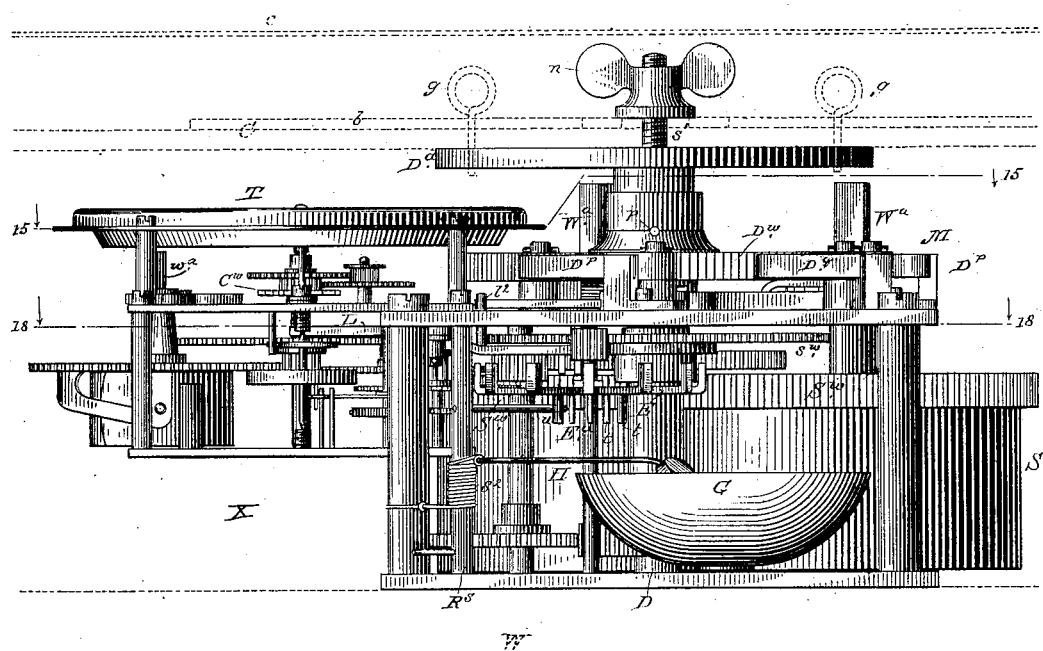
Figure 13:
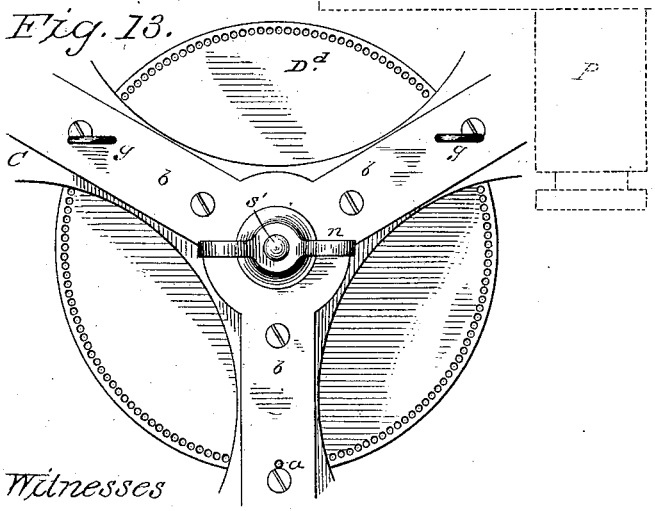
Figure 14:
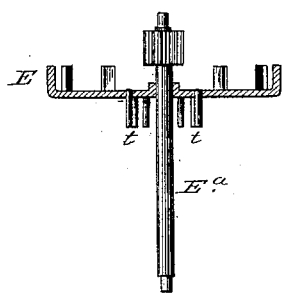

Figure 1 of these drawings is a top view of a time-check apparatus illustrating this invention. Fig. 2 is a side elevation or edge view thereof, and Fig. 3 is a face view of a time check messenger-ticket as used therewith. Figs. 4 to 18, inclusive, are detail views on a larger scale, Fig. 4 representing a radial vertical section; Fig. 5, a fragmentary plan view with check-case rim and rotary mask removed; Fig. 6, a fragmentary side view with portions broken away to expose the electrical connections; Fig. 7, a plan view of a portion of the base-ring seen at the bottom in Fig. 6; Fig. 8, a section through the mask at right angles to the "issue-hole lid;" Fig. 9, a section through the mask in the radial plane of the "receiving-hole" therein; Fig. 10, a like radial section through the "stripping-hole lid" and central "cover;" Fig. 11, a fragmentary top view of the mask and check-case rim, showing the former as set for beginning with the beginning of the series to replenish the issue-compartments with tickets or checks; Fig. 12, an edge view of the motor and time mechanisms, with a corresponding section through the check-case, mask, and cover in dotted lines; Fig. 13, a central top view from beneath said cover; Fig. 14, a section of the motor escapement-wheel on its arbor; Fig. 15, a top view of the motor and time mechanisms, half in horizontal section on the line 15 15, Fig. 12; Fig. 16, a perspective view of the extra cam-wheel of the time mechanism; Fig. 17, a fragmentary section showing an edge view of the escapement-lever which connects said motor and time mechanisms, and Fig. 18 a horizontal section of the motor and time mechanisms on the line 18 18, Fig. 12. Figs. 19 and 20 represent, respectively, a vertical section through the lower part of the apparatus and a "counter-top," to which it is attached, and a horizontal section on the line 0 0, Fig. 19, on the same scale as Figs. 1 to 3.

Like letters of reference indicate corresponding parts in the several figures.

The external parts of this improved time-check apparatus, as seen in Figs. 1 and 2, are the rim $r$ and cylindrical outer wall of a circular horizontal ticket-case or check-case, A, preferably of brass, with a circumferential hand-rail, $h$, applied thereto, the edge with metallic guard-rim $q$ of a base-ring, B, preferably of wood, a rotary cover or mask, C, preferably of wood, with a metallic central cover proper, $c$, and its lock or seal fastening $cf$, an issue-hole lid, $il$, attached to the top of said mask by a spring-hinge, so as to be normally closed, a receiving-hole, $rh$, in the form of a radial slot in said mask, and a stripping-hole lid, $sl$, disappearing beneath said cover $c$, by which it is secured. Said check-case A has immediately beneath said mask C two annular series of open-topped check-compartments, I R, and a large central chamber, X, concentric with each other, as indicated in dotted lines in Fig. 1 and exposed to view in Figs. 4 and 5. The outer series of check-compartments, I, hereinafter termed "issue-compartments," are, by preference, one hundred and forty-four in number, so as to correspond with the five-minute graduations of a twelve-hour clock-dial and with the time-control characters $tc$, Fig. 3, on a corresponding series of time-check messenger-tickets — for example, representing uniform "short time-periods," each of five minutes duration. Said issue-compartments communicate successively, as said mask C rotates, with the issue-hole $ih$ in the latter. (Seen in dotted lines in Figs. 1, 4, and 8.)

The inner series of check-compartments, R, hereinafter termed "receiving-compartments," are, by preference, forty-eight in number, corresponding with the quarter-hour graduations of a twelve-hour-clock dial. Emptying them is facilitated by the greater width which they thus have in a combined issue-controlling and receiving apparatus of given diameter. The receiving capacity of the apparatus is also thus increased. To further increase the latter, these receiving-compartments R are also made of greater depth than the issue-compartments I, as shown in Fig. 4. Said receiving-compartments communicate successively with said receiving-hole $rh$, Figs. 1 and 9, as the mask C rotates, and the stripping-hole $sh$, Fig. 10, which said stripping-hole lid $sl$ covers, communicates also therewith when opened for the inspection of the apparatus or for emptying these compartments. Within said central chamber, X, a motor mechanism, M, and a time mechanism, T, (shown by Figs. 12 to 18, inclusive,) are so arranged upon a circular wooden false bottom, W, Figs. 4 and 12, that the driving-arbor D of the motor mechanism is at the center of the apparatus.

The time mechanism T represented in the drawings is that of a small clock provided with a cam-wheel, $Cw$, Figs. 12, 15, and 16, of twelve wings, on the lower end of the minute-hand arbor $Ma$. The remainder of the works and their accessories may be ordinary, and need not therefore be particularly described. Said cam-wheel, it will be observed, turns with the minute-hand according to the time of day as regards fractions of the current hour, and the faces of its wings are in the direction of rotation. It consequently during each twelfth of a revolution—that is to say, during each five minutes—acts gradually on and then suddenly trips a stud-pin, $l$, on the subjacent outer end of a lever, L, Figs. 12, 15, 17, and 18, which projects into the time mechanism and upward through its top-plate, as seen in Fig. 17, so as to coact with said cam-wheel. Said lever L belongs to the motor mechanism M as an accessory, and is attached to its top plate by a pivot, as shown in Fig. 17, its spring $s$ being also attached to said top plate. The lever has a second upwardly-projecting stud-pin, $l^2$, to engage with said spring, and a pair of downwardly-projecting escapement-studs, $e$, at its inner extremity. Apart from this and details which need not be mentioned, said motor mechanism M comprises a pair of strong helical springs, S, (shown in Fig. 12, and in dotted lines in Fig. 18,) coiled around winding arbors $Wa$ and directly connected with large spur-wheels $Sw$, which transmit motion to said driving-arbor D through a speed-reducing train of alternating pinions and spur-wheels common to both large spur-wheels, as clearly shown in Fig. 18. An escapement-train, consisting of a spur-wheel, $sw$, and a small pinion, connects said driving-arbor with an escapement-arbor, $Ea$, Figs. 12, 14, and 18. The latter carries an escapement-wheel, E, having twelve radial wings with upturned ends, which successively coact with said escapement-studs $e$ of said lever L, and provided with downwardly-projecting tappet-pins $t$ of the same number, which engage a rebent arm, $u$, of a rock-shaft, $Rs$, to operate, with the aid of a small striking-spring, $s^2$, a hammer, H, carried by said rock-shaft, so as to strike a gong-bell, G, once each time the lever L oscillates and said escapement-wheel turns one-twelfth. Consequently, if said spur-wheel $sw$ have one hundred and forty-four teeth, and the pinion on said escapement-arbor $Ea$ twelve teeth, each movement of said escapement-wheel will permit said driving-arbor D to make one one-hundred-and-forty-fourth of a turn under the impulse of said springs S at the end of each five minutes, which is what said escapement, in connection with said time mechanism, is primarily designed to effect, and each of such movements is attested by a stroke on the bell G.

Upon the top plate of said motor mechanism a detent-wheel, Dw, of large diameter, having one hundred and forty-four ratchet-teeth, is mounted on said driving-arbor D, as best seen in Fig. 15, and made fast thereon by a pin, p. This wheel is engaged at three equidistant or substantially equidistant points by detent-pawls Dp, with strong springs to prevent retrogression and backlash, and at another point by a supplemental detent-pawl, Dq, which becomes effective at an intermediate stage of each movement, so as to prevent straining the escapement should efforts be made to obstruct the working of the apparatus.

It will be understood that if the control time-period were three minutes, instead of five minutes, the number of wings of the cam-wheel Cw would be twenty, instead of twelve, the motor-escapement and detent-wheel would be correspondingly modified, and the number of issue-compartments would be two hundred and sixty, instead of one hundred and forty-four; and with other time-periods the apparatus would be modified in these respects according to the time-period, which may be shorter or longer than five minutes, if preferred. Now, together with said detent-wheel Dw, there is pinned fast upon said upper end of the driving-arbor D a concentric horizontal disk, Dd, which has near its perimeter a series of vertical holes, as seen in Fig. 15, corresponding in number with said issue-compartments I of the check-case A, and in distance from the center of the apparatus corresponding with holes a, Fig. 13, in said mask C. Two of the latter and a corresponding pair of the holes in said disk Dd are occupied by a pair of gage-pins, g, adapted to hold firmly in the disk, to determine the adjustment of the mask, as hereinafter set forth. The upper end of the arbor is further provided with a stud screw, s', which projects above the plane of the mask, and its protruding end receives a thumb-nut, n, by which the mask is tightly clamped down upon said disk Dd. A metallic tripod-brace, b, strengthens the center of the mask for coaction with said nut and said gage-pins. Access to said gage-pins and nut is prevented by said locked or sealed cover c, which overlies them, together with the inner end of said stripping hole lid sl, as aforesaid. The outer end of this lid is secured by a keeper-fastening, k, Figs. 1 and 10. Beneath said cover, when it is fastened, there are also three large holes in the mask, formed between the ends of said brace b. as best seen in dotted lines in Fig. 1, through which access is had to said motor mechanism and time mechanism for winding them and setting the latter. The perimeter of said mask C is strengthened by a metallic rim, m, riveted to its back, and is confined beneath an overlying flange of said rim r of the check-case, as shown in Fig. 4, so that when released, by unscrewing said thumb-nut n and withdrawing said gage-pins g after the cover c is unfastened and thrown back or detached, the mask is simply free to be rotated by hand independently of the motor mechanism. The top of the perimeter of the mask is graduated and stamped, together with the outer end of the issue hole lid il, as best seen in Fig. 11, with characters in the interspaces indicating the beginning of each of the short-time periods represented by the one hundred and forty-four issue-compartments, respectively, starting with "12" (meaning the five minutes from 12 o'clock to 12.5) and ending with "11.55," (meaning the five minutes from 11.55 to 12 o'clock.) These characters read in connection with a fixed pointer or index on said rim r, which is marked 12 and corresponds with the 12-point of a twelve-hour clock-dial. When 12 on the mask coincides with said index 12, as in said Fig. 11, all the characters on the mask correspond with the time-periods of the respective compartments beneath them. This occurs at twelve o'clock, (day or night,) at which hour it is consequently best to replenish the issue-compartments with tickets or checks. During any other five minutes of the clock the characters coinciding with said index 12 indicate simply the time-period of the issue-compartment, which, for the time being, is beneath and in communication with the issue-hole ih, and also the receiving-compartment beneath the receiving-hole rh. Said metallic rim m overlaps the upper edge of said outer wall of the ticket-case A, and is always in contact therewith at one or more points, which is further utilized as an electrical connection between the hinge of said issue-hole lid il and the metallic body of the ticket-case, which is connected by a contact-spring, $s^-$, Figs. 5 and 6, with a metallic track, $t^-$, and therethrough with a wire, $w^-$, which leads to the electric register or recorder. The register or recorder may be of any approved kind, and located at any convenient point, as the central office. The wire $w^+$ from the electric battery is connected in turn by a metallic track, $t^+$, concentric with the former, a contact-spring, $s^+$, and an insulated wire, w, with a metallic ring, $r^+$, supported by insulators i in notches at the top of the check-case A, beneath the mask C, as best seen in Figs. 4 and 5. Said issue-hole lid il carries at the inner end of its hinge a metallic contact-finger, f, which, when the lid is raised, as shown in dotted lines in Fig. 4, works through a slot in the mask and presses laterally against said ring $r^+$, so as to complete a circuit through the hinge of said lid and said register or recorder connections, so as to indicate the fact and preserve a tally or record of the work of the apparatus as regards the issue of tickets or checks. To supplement this tally or record all the tickets, Fig. 3, of said series which are placed in the apparatus originally and those added from time to time are consecutively numbered, as indicated at tn in the figure last referred to. Thus, if more than one ticket be taken out when the issue-hole lid is raised this fact will be apparent on examining the tickets. Said metallic ring $r^+$ is made annular, so as to coact with said contact-finger $f$ in every position of the issue-hole lid as the mask C rotates relatively to the check-case. Likewise said metallic tracks $t^-$ $t^+$ are made annular, so that said contact-springs $s^-$ $s^+$ may coact therewith in all their positions, being shifted by turning the check-case by means of the hand-rail $h$. Said contact-springs $s^-$ $s^+$, it will be observed, are attached to the metallic bottom of the outer portion of the check-case A, the one last mentioned, $s^+$, by an insulator, $is$, and the metallic tracks $t^-$ $t^+$ are arranged within an annular recess in the top of said wooden base-ring B, which is fixedly attached to the top of the counter or stand upon which the apparatus rests, the electric wires being carried through it to and from the apparatus, as best seen in Figs. 4, 6, 7, and 19. A downwardly-projecting vertical pivot, P, Figs. 12, 19, and 20, is strongly attached to the bottom of the central portion of the ticket-case by screws entering said wooden false bottom W within the latter, and a step-bearing, Q, matching the same, is attached to said counter or stand top, and depends therethrough, as seen in Fig. 19. The depending end of the step-bearing has a transverse perforation and the pivot has a corresponding circumferential groove, which receives a key, K, having a head at one end, and secured against withdrawal by a lock or seal fastening, $kf$, applied to its other end, as represented in Fig. 20. Lifting the check-case is thus precluded, while its rotation by means of the hand-rail $h$ is facilitated. It is so rotated to bring the issue-hole and receiving-hole into convenient positions on the opposite sides of the counter or stand, and to facilitate access to the respective check-compartments in emptying the receiving-compartments and replenishing the issue-compartments with tickets or checks, as aforesaid. Said step-bearing Q having been secured in position, and said base-ring B attached so as to be concentric therewith and connected with the electric battery and register or recorder by the wires $w^+$ $w^-$, the remainder of the apparatus, with its parts united as aforesaid, is lowered into place and secured by applying said key K and fastening $kf$. Said cover $c$ is then unfastened and thrown back or detached, the gage-pins $g$ withdrawn, and the thumb-nut $n$ unscrewed or partly unscrewed. The mask C is now free to rotate independently of the motor mechanism M, and is turned by hand until 12 thereon is at the index 12 on the rim $r$, the check-case A being turned also by means of the hand-rail $h$ until said index 12 is convenient to the operator. The issue-hole lid $il$ is now lifted and held open by one hand, while with the other the operator places in the 12 issue-compartment a supply of tickets, Fig. 3, bearing corresponding time-control characters, 12 to 12.5. The check case or mask is then turned so as to expose the issue compartment next to the left, which is supplied with tickets for the time-period beginning at 12.5, and so on until all the issue-compartments are supplied. The clock-dial $d$, Fig. 15, and the winding-arbors W$a$ $wa$ of the motor and time mechanisms are now exposed through the large mask-holes shown beneath the cover $c$ by dotted circles in Fig. 1, the clock-hands being set, if need be, and the motor and time mechanisms wound, if they require it. Noting the time, the mask C is now turned so that the index 12 shall point to the characters on its perimeter indicating the current five minutes. The mask is then fastened to the motor mechanism by inserting the gage-pins $g$ and screwing down the thumb-nut $n$, and the cover $c$ is closed and secured by the fastening $cf$. Now the apparatus is ready to be left in the hands of those whose doings it is to control. The perimeter of the mask is guarded by said rim $r$, and its rotation step by step is effected by said motor mechanism M under the control of said time mechanism T, so that it turns two and a half degrees, or one one-hundred-and-forty-fourth of a revolution, at the end of each five minutes, and remains locked until the end of the next five minutes, while the rotation of the check-case by means of the hand-rail $h$ does not affect its operation nor that of the electric register or recorder connected therewith, as hereinbefore set forth.

Supposing, now, a call for a messenger during the five minutes beginning at 5.15, as indicated in Fig. 1, the issue-hole lid $il$ is lifted, and from the issue-compartment beneath a ticket, Fig. 3, bearing the corresponding time-control characters "5.15 to 5.20" is withdrawn. The blanks of this ticket after "Date" and under "Messenger" and "Called" are filled by the clerk, a correct entry in the latter being insured by the apparatus and said time-control characters on the ticket. The place to which the messenger is called, the character of the corresponding account, (cash or credit,) and other like data may preferably be added by a printed paster, as set forth in the specification of my aforesaid application No. 168,169, filed June 9, 1885. When the messenger returns the clerk makes the proper entries under "Returned," "Occupied," and "Expense," and adds in a blank, $x$, at the right "Paid" or "Charged," as the case may be, or a corresponding symbol, and under it the charge determined by said controlled entry under "Called," and said entries under "Returned" and "Occupied," which are likewise controlled by the apparatus, as the ticket cannot be returned to any receiving-compartment preceding the one which represents the current receiving time-period. The ticket is now inserted by the messenger or clerk through the receiving-hole $rh$ into the receiving-compartment R beneath it. If the return be at fifteen minutes past seven o'clock, for example, 7.15 on the mask C will be at the index 12 on the rim $r$, and the open receiving-compartment will represent the receiving time-period 7.15–7.30, remaining open until it expires, and receiving all tickets received during this period.

To detect attempts to evade the control which the apparatus affords if properly used, inspections will be made at irregular intervals by "stripping" one or more selected receiving-compartments of their contents for examination. This is effected by unfastening the cover c, lifting the stripping-hole lid sl thus released, and disengaging it at k, detaching the mask C from the motor mechanism by withdrawing the gage-pins g and unscrewing the thumb-nut n, turning the mask so as to bring the stripping-hole over any particular receiving-compartment, as indicated by the index 12, withdrawing the contents of this compartment, and either marking and retaining the same or at once examining and replacing them, after which the mask is readjusted according to the issuing time-period then current and reattached to the motor mechanism, said lid sl and cover c are reclosed, and the latter secured by its fastening cf. Emptying all the receiving-compartments at the end of each day and readjusting the mask thereafter are effected by the same means.

For many purposes metallic checks or more simple tickets may be used in connection with this apparatus, as for checking charges and receipts for the use of billiard-tables and other game apparatus by the hour, or for determining the arrival and departure of watchmen and workmen. It will also be obvious that many of the features hereinbefore set forth will possess the same or substantially the same functions and advantages if the apparatus be adapted simply for controlling the issue of time-checks or the like, or simply for receiving time-checks or the like; also, that the apparatus may be modified in many features of mechanical construction, as well as by omissions, transpositions, and the like, without materially affecting the respective features of this invention, as hereinafter claimed; also, that said motor mechanism and said time mechanism may be driven or controlled by electricity in known ways, instead of by springs, and that the electrical connections hereinbefore described in kind will suffice for electrical apparatus so applied.

Having thus described my said improvement in time-check apparatus, I claim as my invention and desire to patent under this specification—

1. An improved time-check apparatus having a circular horizontal check-case containing issue-compartments and receiving-compartments in concentric annular series with open tops in a given horizontal plane, a mask common to all provided with issue and receiving holes, a motor mechanism which turns one relatively to the other at the ends of given short time-periods, so as to open successive compartments of each series, and a time mechanism which releases and relocks said motor mechanism at the proper moments, substantially as herein specified.

2. In a time-check apparatus, a circular horizontal check-case containing open-topped check-compartments in concentric annular series, the inner series being receiving-compartments representing relatively long uniform time-periods, so as to be capacious, while the outer series are issue-compartments, which may consequently represent relatively short time-periods, in combination with a rotary mask common to all having issue and receiving holes in communication with the respective series, substantially as herein specified.

3. In a time-check apparatus, a circular horizontal check-case of two diameters containing open-topped check-compartments in concentric annular series, the inner series being receiving-compartments and within the smaller diameter of the case, so as to be of greater depth than the outer series, while the latter, owing to the larger circumference of the series, are adapted to be multiplied in number, so as to represent very short time-periods.

4. In a time-check apparatus, the combination, substantially as herein specified, of a check-case containing open-topped check-compartments in annular series, and provided at top with a hollow rim carrying a fixed pointer or index and a rotary mask perforated to afford access to said compartments successively, having its edge within said rim and provided immediately within said rim with graduations and time-period characters reading in connection with said index and corresponding with the series of check-compartments, or with that series having the shortest time-period.

5. In a time-check apparatus, the combination, substantially as herein specified, of a check-case containing open-topped check-compartments in annular series, and provided at top with a fixed hollow rim, a rotary mask having its edge within said rim and perforated to afford access to said compartments successively, and a motor mechanism having a mask-driving disk from which said mask may be disconnected at will, so as to rotate independently.

6. In a time-check apparatus, the combination, substantially as herein specified, of a check-case containing open-topped check-compartments in annular series, and provided at top with a fixed hollow rim, a suitably-perforated rotary mask having its edge within said rim, a central driving-disk beneath said mask, means for connecting said mask with said disk and for disconnecting them at will, and an overlying cover carried by said mask and having a lock or seal fastening which protects said connecting and disconnecting means.

7. In a time-check apparatus, a check-case containing open-topped receiving-compartments in annular series, and a rotary mask above said compartments having a radial stripping-hole provided with a lid, in combination with a central driving-disk beneath said mask, means for connecting said mask with said disk and for disconnecting them at will, and an overlying cover carried by said mask and having a lock or seal fastening which protects said connecting and disconnecting means and said lid.

8. In a time-check apparatus, the combination, substantially as herein specified, of a check-case containing open-topped check-compartments in annular series and adapted to be rotated at will to locate individual compartments in convenient positions, a rotary mask perforated to afford access to said compartments successively, a motor mechanism carried by said check-case and connected with said mask to rotate the latter intermittently, and a time mechanism connected with said motor mechanism and serving to start and stop the latter automatically at the beginning of successive uniform time-periods corresponding with those of the check-compartments, or of that series having the shortest time-period.

9. In a time-check apparatus, the combination, substantially as herein specified, of a motor mechanism comprising two or more driving-springs, a single speed-reducing train and an escapement-train connected with a driving-arbor, a time mechanism having a cam-wheel which moves synchronously with the minute-hand and has a wing for each of a given number of uniform fractions of the hour, and an escapement-lever moved by each of said cam-wings and coacting with an escapement-wheel in said escapement-train.

10. In the within described motor mechanism, the combination, with its driving-arbor, of a detent-wheel of large diameter having one or more teeth for each fractional part of a revolution represented by the time-period of the apparatus, or the shortest time-period if there be two, and engaged at two or more points by detent-pawls to preclude backlash.

11. In the within-described motor mechanism, the combination, with its driving-arbor, of a detent-wheel of large diameter engaged at two or more points by detent-pawls to preclude backlash and at another point by a supplemental detent-pawl which is effective intermediately, for the purpose set forth.

12. In a time-check apparatus, a check-case containing open-topped issue-compartments in annular series and an overlying rotary mask having above said compartments an issue-hole provided with a normally-closed lid carrying a contact-finger, in combination with a metallic ring supported by insulators within the top of the check-case, and electrical connections to and from said ring and said finger for actuating an electric register or recorder each time said lid is raised, substantially as herein specified.

13. In a time-check apparatus, the combination, substantially as herein specified, of a rotary check-case containing open-topped issue-compartments in annular series, a rotary mask having an issue-hole affording access to said compartments successively and provided with a normally-closed lid carrying a contact-finger, a metallic ring supported beneath said mask by insulators, a pair of contact-springs carried by said case and electrically connected with said ring and said finger, and a wooden base-ring provided with annular metallic tracks concentric with said case and in constant contact with said springs, respectively, and electrically connected with a register or recorder circuit, for the purpose set forth.

14. In a time-check apparatus, the combination, with a rotary check-case containing check-compartments in annular series, appropriated to successive uniform time-periods, and carrying a pair of depending contact-springs, of a wooden base-ring having a recessed top provided with a pair of annular metallic tracks concentric with said case in constant contact with said springs, respectively and electrically connected with circuit-wires, substantially as herein specified.

15. In a time-check apparatus, the combination, with a rotary check-case and a base-ring having electrical connections, of a downwardly-projecting central pivot attached to said check-case, a step-bearing for said pivot secured to a counter-top or the like and depending therethrough, and a key occupying a circumferential groove and tangential perforation in said pivot and bearing, respectively, and provided with a lock or seal fastening, substantially as herein specified.

Signed at Brooklyn this 8th day of September, 1885.

JOHN S. GOLDSMITH.

Witnesses:
J. I. CONKLIN, Jr.,
JAS. L. EWIN.